3,053,644
PROCESS FOR ISOLATING RADIO-ACTIVE
IODINE 131
Wilhelmus Bernardus Huising, Herman Hendrik Philip Moeken, and Dirk Nonhebel, all of Amsterdam, Netherlands, assignors to North American Philips Company, Inc., New York, N.Y., a corporation of Delaware
No Drawing. Filed Sept. 5, 1958, Ser. No. 759,155
Claims priority, application Netherlands Sept. 9, 1957
3 Claims. (Cl. 23—294)

It is known that bombardment of tellurium by slow neutrons results in radio-active iodine 131 being produced, which may be isolated from the initial material in various ways.

It is also known, that tellurium dioxide, containing radio-active iodine 131, may be heated in an oven to a temperature between 650° C. and 700° C., preferably in a flow of oxygen, to evaporate the iodine which then may be collected in the usual manner in a solution of sodium hydroxide.

In Nucleonics 12, #3 August pages 22 etc. (1954), there is described a method to produce iodine 132 from $Te^{132}O_2$. The tellurium dioxide is dissolved in alkaline lye and then precipitated by the addition of acetic acid. The iodine thus remains in the solution which, after filtration, may be used as such. It is not known whether the iodine is present in the liquid in the molecular or the ionogenous state, but probably there is a mixture of iodide ions and iodate ions in addition to a little molecular iodine.

It has now been found that iodine 131 may be obtained in a simple manner from tellurium dioxide bombarded by slow neutrons, neither heating to high temperatures nor filtration then being required.

According to the invention, the so thus bombarded tellurium dioxide is suspended in an aqueous acid solution, followed by heating, the iodine 131 then distillating over and being collected in a manner known per se.

The aqueous acid solution preferably contains oxygen, preferably in the form of peroxide hydrogen.

For carrying out the process according to the invention, finely-ground tellurium dioxide is bombarded by slow neutrons. The powder obtained is suspended in a solution of sulphuric acid containing peroxide hydrogen. The suspension is heated to boiling. The increase in temperature results in hydration and hence in variation in the crystal lattice of the tellurium dioxide, so that the iodine is expelled from the lattice and finds its way into the aqueous liquid, from which it is removed by distillation and collected.

*Example*

150 gms. of finely-ground $TeO_2$ bombarded by slow neutrons are introduced into a receiver having a round bottom, to which 500 ccs. of distilled water, 50 ccs. of 30% hydrogen peroxide and 450 ccs. of concentrated sulphuric acid are added. The mixture then acquires already a comparatively high temperature and only little heat is necessary for distilling over the iodine. The receiver is heated until radio-activity is not distilled over any longer. The distillate is collected in diluted alkaline lye.

It has been found that optimum results are obtained if the concentration of sulphuric acid in the liquid is about 50%. In this case, about 96% of the iodine 131 finds its way into the aqueous layer. With a 90% concentration of the sulphuric acid, radio-activity did not distil over, nor below 10%.

What is claimed is:
1. A method of isolating radio-active iodine 131 produced by the bombardment of tellurium dioxide with slow neutrons comprising the steps, suspending said iodine 131 containing tellurium dioxide in an aqueous solution of sulfuric acid and an oxidizing agent, heating said suspension to a temperature sufficiently high to cause hydration of the crystal lattice of the tellurium dioxide thus causing the iodine 131 to be expelled from said crystal lattice, and to dissolve in the acid solution, further heating said suspension to distill over the resultant solution of the iodine 131, and collecting the resultant distillate in a dilute solution of lye.

2. A method of isolating radio-active iodine 131 produced by the bombardment of tellurium dioxide with slow neutrons comprising the steps, suspending said iodine 131 containing tellurium dioxide in an aqueous solution of sulfuric acid and hydrogen peroxide, heating said suspension to a temperature sufficiently high to cause hydration of the crystal lattice of the tellurium dioxide thus causing the iodine 131 to be expelled from said crystal lattice, and to dissolve in the acid solution, further heating said suspension to distill over the resultant solution of the iodine 131, and collecting the resultant distillate in a dilute solution of lye.

3. The method of claim 2 in which the aqueous solution of sulfuric acid contains about 50% of sulfuric acid.

References Cited in the file of this patent
UNITED STATES PATENTS
2,710,249    Winsche _____ June 7, 1955
FOREIGN PATENTS
763,865    Great Britain _____ Dec. 19, 1956
OTHER REFERENCES
Arrol: Nuclear Science Abstracts, vol. 6 (1952), #151.
Rupp et al.: "Production of Fission Product Iodine 131," O.R.N.L. 1947, declassified July 7, 1955, pp. 4, 5 and 8.